(12) United States Patent
Mayer et al.

(10) Patent No.: US 6,656,983 B1
(45) Date of Patent: Dec. 2, 2003

(54) VINYLAROMATIC/1,3-DIENE COPOLYMER STABILIZED WITH PROTECTIVE COLLOIDS AS ADHESIVES FOR POROUS SUBSTRATES

(75) Inventors: Theo Mayer, Julbach (DE); Thomas Kohler, Kastl (DE); Reinhard Harzschel, Burghausen (DE); Hans-Peter Weitzel, Reischach (DE); Bernd Schilling, Macungie, PA (US)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/856,538

(22) PCT Filed: Nov. 18, 1999

(86) PCT No.: PCT/EP99/08871

§ 371 (c)(1),
(2), (4) Date: Aug. 1, 2001

(87) PCT Pub. No.: WO00/31204

PCT Pub. Date: Jun. 2, 2000

(30) Foreign Application Priority Data

Nov. 24, 1998 (DE) .......................... 198 54 236

(51) Int. Cl.⁷ .................................. C08L 1/00
(52) U.S. Cl. .......................... 524/35; 524/37; 524/43; 524/45; 524/47; 524/48; 524/800; 524/819; 524/820; 524/823; 524/824
(58) Field of Search .............................. 524/47, 48, 35, 524/37, 43, 45, 800, 819, 820, 823, 824

(56) References Cited

U.S. PATENT DOCUMENTS

| | | | | |
|---|---|---|---|---|
| 3,970,629 A | * | 7/1976 | Izaki | 260/29.6 |
| 4,269,657 A | * | 5/1981 | Gomez | 162/135 |
| 5,830,934 A | * | 11/1998 | Krishnan | 524/43 |
| 6,221,952 B1 | * | 4/2001 | Nakamae | 524/503 |

FOREIGN PATENT DOCUMENTS

| | | |
|---|---|---|
| DE | 197 05 753 A1 | 6/1999 |
| EP | 0 924 241 A2 | 6/1999 |
| JP | 58 162645 | 9/1983 |
| JP | 1 229085 | 9/1989 |
| WO | WO 96/37551 | 11/1996 |
| WO | WO 98/35995 | 8/1998 |
| WO | WO 99/26360 | 5/1999 |

OTHER PUBLICATIONS

Derwent Abstract Corresponding to JP 1/229085 [An 89–3312288[43]].
Derwent Abstract Corresponding to JP 58/162645 [An 83–805435 [44]].
Fox T. G., Bull. Am. Phusics Soc. 1, 3, p. 123 (1956).
Polymer Handbood, 2$^{nd}$ Edition. J. Wiley & Sons, New York (1975).
Chemical Abstracts, vol. 103, No. 2 XP002132714 abstr. No. 7688 (JP 60009970).
Chemical Abstracts, vol. 129, No. 11, XP002132715 abstr. No. 1369943 [JP 10195312].
Derwent Abstract Corresponding to EP 0 924 241 [AN 1999–339940 [29]].

* cited by examiner

*Primary Examiner*—Edward J. Cain
(74) *Attorney, Agent, or Firm*—Brooks & Kushman P.C.

(57) ABSTRACT

The invention provides mixed aromatic vinyl-1,3-diene polymers stabilized by a protective colloid and present in the form of aqueous polymer dispersions or polymer powders redispersible in water as adhesives for porous substrates. The polymer dispersions and the polymer powders are obtained by emulsion polymerization of a mixture containing: a) 20 to 80 percent by weight of one or more vinylaromatics; b) 19.9 to 79.9 percent by weight of one or more 1,3-dienes; c) 0.1 to 15 percent by weight of one or more comonomers from the group consisting of N-methylolacrylamide, N-methylolmethacrylamide and the N-(alkoxymethyl)-acrylamides and N-(alkoxymethyl)-methacrylamides with a $C_1$ to $C_6$-alkyl radical. The sum of the above percentages adds up to 100% by weight. Emulsion polymerization is carried out in the presence of one or more protective colloids and without emulsifiers, optionally followed by drying of the resulting aqueous polymer dispersion.

20 Claims, No Drawings

# VINYLAROMATIC/1,3-DIENE COPOLYMER STABILIZED WITH PROTECTIVE COLLOIDS AS ADHESIVES FOR POROUS SUBSTRATES

BACKGROUND OF THE INVENTION

1. Field of the Invention

The invention relates to the use of vinylaromatic/1,3-diene copolymers stabilized with protective colloids and in the form of their aqueous polymer dispersions or water-redispersible polymer powders as adhesive for porous substrates.

2. Background Art

WO-A 96/37551 discloses wood adhesives which comprise a mixture of a polymer containing hydroxyl groups, in particular polyvinyl alcohol, and a carboxyl-substituted styrene polymer, in particular styrene/butadiene latex, and a polyfunctional aziridine as the crosslinking agent for hydroxyl and carboxyl groups. When these polymers are used as wood adhesives, however, there is the disadvantage that, because of their high reactivity in the ready-to-use state, these cannot be used as storage-stable one-component systems.

JP-A 1/229085 (Derwent Abstract AN 89-312288) discloses wood adhesives which are composed of a chelating agent and a dissolved or dispersed adhesive. Polymer dispersions based on vinyl acetate, acrylate or styrene/butadiene, in addition to condensation resins, are mentioned here in particular as adhesives. These can optionally contain polyvinyl alcohol as a dispersing agent. Dibasic acids, such as oxalic or malonic acid, in addition to oxocarboxylic acids, and salts thereof, are mentioned as chelating agents.

JP-A 58/162645 (Derwent Abstract AN 83-805435) discloses adhesives for gluing porous materials, for example wood. The adhesives consist of a mixture of a vinyl acetate/ethylene copolymer dispersion and a styrene/butadiene latex modified with carboxyl groups, the dispersions mentioned being stabilized by emulsifiers. A problem with emulsifier-stabilized dispersions is their unsatisfactory resistance to water.

JP-A 60009970 discloses an adhesive composition for carpet bonding, containing glycine in order to prevent bubbling. The binder is again an emulsifier-stabilized latex with the drawback of unsatisfactory water resistance.

The invention was thus based on the object of providing adhesives which are distinguished by improved hydrophobicity and resistance to water compared with the known adhesives for porous materials, with a simultaneously good storage stability.

SUMMARY OF THE INVENTION

The invention relates to the use of vinylaromatic/1,3-diene copolymers, having a glass transition temperature Tg of $-70°$ C. to $+100°$ C., stabilized with protective colloids and in the form of their aqueous polymer dispersions or water-redispersible polymer powders as adhesives for porous substrates, the polymer dispersions and the polymer powders being obtained by emulsion polymerization of a mixture comprising a) 20 to 80% by weight of one or more vinylaromatics,
 b) 19.9 to 79.9% by weight of one or more 1,3-dienes,
 c) 0.1 to 15% by weight of one or more comonomers from the group consisting of N-methylolacrylamide, N-methylolmethacrylamide and the N-(alkoxymethyl)-acrylamides and N-(alkoxymethyl)methacrylamides with a $C_1$- to $C_6$-alkyl radical, the data in % by weight adding up to 100% by weight, in the presence of one or more protective colloids and with the exclusion of emulsifier, and optionally drying the aqueous polymer dispersion obtained by this process.

Suitable vinylaromatics are styrene and methylstyrene, and styrene is preferably copolymerized. Examples of 1,3-dienes are 1,3-butadiene and isoprene, and 1,3-butadiene is preferred. The content of comonomers a) and b) is preferably in each case 30 to 70% by weight, based on the total weight of the comonomers.

DESCRIPTION OF THE PREFERRED EMBODIMENTS

Up to 30% by weight, based on the total weight of the monomer phase, of further monomers which can be copolymerized with vinylaromatics and 1,3-dienes, such as vinyl chloride, (meth)acrylic acid esters of alcohols having 1 to 15 C atoms or vinyl esters of unbranched or -branched carboxylic acids having 1 to 15 C atoms, can optionally also be copolymerized.

0.05 to 10% by weight, based on the total weight of the monomer mixture, of auxiliary monomers can optionally also be copolymerized. Examples of auxiliary monomers are ethylenically unsaturated mono- and dicarboxylic acids, preferably acrylic acid, methacrylic acid, fumaric acid and maleic acid; ethylenically unsaturated carboxylic acid amides and nitriles, preferably acrylamide and acrylonitrile; mono- and diesters of fumaric acid and maleic acid, such as the diethyl and diisopropyl esters, and maleic anhydrides; and ethylenically unsaturated sulphonic acids and salts thereof, preferably vinylsulphonic acid and 2-acrylamido-2-methylpropanesulphonic acid. Further examples are pre-crosslinking comonomers, such as poly-ethylenically unsaturated comonomers, for example divinyl adipate, diallyl maleate, allyl methacrylate or triallyl cyanurate. Epoxide-functional comonomers, such as glycidyl methacrylate and glycidyl acrylate, are also suitable. Further examples are silicon-functional comonomers, such as acryloxypropyltri(alkoxy)- and methacryloxypropyltri-(alkoxy)-silanes, vinyltrialkoxy silanes and vinylmethyldialkoxy silanes, which can contain, for example, ethoxy and ethoxypropylene glycol ether radicals as alkoxy groups. Monomers with hydroxyl or CO groups, for example methacrylic acid and acrylic acid hydroxyalkyl esters, such as hydroxyethyl, hydroxypropyl or hydroxybutyl acrylate or methacrylate, and compounds such as diacetoneacrylamide and acetylacetoxyethyl acrylate or methacrylate, may also be mentioned.

The choice of monomer and the choice of the weight contents of the comonomers is taken here such in general a glass transition temperature Tg of $-70°$ C. to $+100°$ C., preferably $-50°$ C. to $+50°$, particularly preferably $-20°$ C. to $+20°$, results. The glass transition temperature Tg of the polymers can be determined in a known manner by means of differential scanning calorimetry (DSC). The Tg can also be calculated beforehand in approximation by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, wherein $x_n$ represents the weight fraction (% by weight/100) of monomer n and $Tg_n$ is the glass transition temperature in degrees Kelvin of the homopolymer of monomer n. Tg values for homopolymers are listed in Polymer Handbook 2nd Edition, J. Wiley & Sons, New York (1975).

Suitable protective colloids are, for example, polyvinyl alcohols, polysaccharides in water-soluble form, such as starches (amylose and amylopectin), modified starches, such as starch ethers, for example hydroxyalkyl ether starches, dextrins and cyclo-dextrins, celluloses and carboxymethyl, methyl, hydroxyethyl and hydroxypropyl derivatives thereof, poly(meth)acrylic acid, poly(meth)acrylamide, melamine-formaldehyde sulphonates and naphthalene-formaldehyde sulphonates.

Polyvinyl alcohols with a degree of hydrolysis of 80 to 95 mol % and a Höppler viscosity in 4% strength aqueous solution of 1 to 30 mPas (Höppler method at 20° C., DIN 53015) are preferred. Hydrophobically modified polyvinyl alcohols with a degree of hydrolysis of 80 to 95 mol % and a Höppler viscosity in 4% strength aqueous solution of 1 to 30 mPas are also suitable. Examples of these are partly hydrolysed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9 to 11 C atoms, dialkyl maleates and dialkyl fumarates, such as diisopropyl maleate and diisopropyl fumarate, vinyl chloride, vinyl alkyl ethers, such as vinyl butyl ethers, and olefins, such as ethene and decene. The content of the hydrophobic units is preferably 0.1 to 10% by weight, based on the total weight of the partly hydrolysed polyvinyl acetate. Mixtures of the polyvinyl alcohols mentioned can also be employed.

The partly hydrolysed polyvinyl acetates with vinyl alcohol units and units of vinyl esters of alpha-branched carboxylic acids having 5 or 9 to 11 C atoms in the amounts mentioned are particularly preferred. Examples of such vinyl esters are those which are available as versatic acid vinyl esters from Shell under the names VeoVa$^R$5, VeoVa$^R$9, VeoVa$^R$10 and VeoVa$^R$11. Further suitable polyvinyl alcohols are partly hydrolysed, hydrophobized polyvinyl acetates, which are obtained by polymer-analogous reaction, for example acetalization, of the vinyl alcohol units with $C_1$- to $C_4$-aldehydes, such as butyraldehyde. The content of the hydrophobic units is preferably 0.1 to 10% by weight, based on the total weight of the partly hydrolysed polyvinyl acetate. The degree of hydrolysis is from 80 to 95 mol %, preferably 85 to 94 mol %, and the Höppler viscosity (DIN 53015, Höppler method, 4% strength aqueous solution) is from 1 to 30 mPas, preferably 2 to 25 mPas.

Polyvinyl alcohols with a degree of hydrolysis of 85 to 94 mol % and a Höppler viscosity in 4% strength aqueous solution of 2 to 25 mPas (Höppler method at 20° C., DIN 53015) and combinations thereof with the hydrophobically modified polyvinyl esters mentioned in a weight ratio of 10/1 to 1/10 are most preferred. The protective colloids mentioned are accessible by means of processes known to the expert.

The polymer powders stabilized with protective colloids are prepared by the emulsion polymerization process, the polymerization temperature in general being 40° C. to 100° C., preferably 60° C. to 90° C. The copolymerization is usually carried out under pressure, in general between 3 bar and 10 bar. The polymerization is initiated with the initiators or redox initiator combinations customary for emulsion polymerization, for example hydroperoxides, such as tert-butyl hydroperoxide, azo compounds, such as azobisisobutyronitrile, and inorganic initiators, such as the sodium, potassium and ammonium salts of peroxodisulphuric acid. The initiators mentioned are in general employed in an amount of 0.05 to 3% by weight, based on the total weight of the monomers. Redox initiators which are used are combinations of the initiators mentioned with reducing agents, such as sodium sulphite, sodium hydroxymethane-sulphinate and ascorbic acid. The amount of reducing agent is preferably 0.01 to 5.0% by weight, based on the total weight of the monomers.

The polymerization batch is stabilized by means of the protective colloids mentioned, without additional emulsifiers. Preferably, some of the protective colloid content is initially introduced here into the reaction vessel, and some is metered in after initiation of the polymerization. The polymerization is in general carried out in the presence of 1 to 25% by weight of protective colloid, based on the total weight of the monomers. The monomers can be initially introduced in total, metered into the reaction vessel in total or initially introduced in portions, with the remainder being metered in after the initiation of the polymerization. The content of post-crosslinking comonomers c) is preferably metered into the reaction vessel in total.

After conclusion of the polymerization, after-polymerization can be carried out using known methods, for example by after-polymerization initiated with a redox catalyst, for removal of the residual monomers. Volatile residual monomers can also be removed by means of distillation, preferably under reduced pressure, and optionally by passing inert entraining gases, such as air, nitrogen or steam, through or over the mixture. The aqueous dispersions obtainable by this process in general comprise 1 to 25% by weight of protective colloid, based on the polymer content, and have a solids content of 30 to 75% by weight, preferably 40 to 65% by weight.

To prepare the water-redispersible polymer powders, the aqueous dispersions are dried, for example by means of fluidized bed drying, freeze drying or spray drying. The dispersions are preferably spray-dried. Spray drying is carried out here in customary spray-drying units, it being possible for the atomization to take place by means of one-, two- or multi-component nozzles or with a rotating disc. The exit temperature is in general chosen in the range from 55° C. to 100° C., preferably 70° C. to 90° C., depending on the unit, the Tg of the resin and the desired degree of drying.

The total amount of protective colloid before the drying operation should preferably be at least 10% by weight, based on the polymer content. To ensure the redispersibility, as a rule it is necessary to add further protective colloids to the dispersion before drying, as spraying aids. The content of protective colloid before spraying of the dispersion is as a rule 5 to 25% by weight, based on the polymeric constituents of the dispersion.

Suitable spraying aids are partly hydrolysed polyvinyl acetates; polyvinyl pyrrolidones; polysaccharides in water-soluble form, such as starches (amylose and amylopectin) and modified starches, such as starch ethers, for example hydroxyalkyl ether starches; celluloses and carboxymethyl, methyl, hydroxyethyl and hydroxypropyl derivatives thereof; proteins, such as casein or caseinate, soya protein and gelatin; lignin-sulphonates; synthetic polymers, such as poly(meth)acrylic acid, copolymers of (meth)acrylates with carboxyl-functional comonomer units, poly(meth)acrylamide, polyvinylsulphonic acids and water-soluble copolymers thereof; and melamine-formaldehyde sulphonates, naphthalene-formaldehyde sulphonates and styrene-maleic acid and vinyl ether/maleic acid copolymers. Partly hydrolysed polyvinyl acetates with a degree of hydrolysis of 80 to 95 mol % and a Höppler viscosity of 1 to 30 mpas, which can optionally be hydrophobically modified as described above, are preferred as spraying aids.

During the spraying, a content of up to 1.5% by weight of antifoam, based on the base polymer, has proved favourable in many cases. To increase the storage stability by improving the stability to blocking, in particular in the case of powders with a low glass transition temperature, an antiblocking agent (anticaking agent), preferably in an amount of up to 30% by weight, based on the total weight of the polymeric constituents, can be added to the resulting powder. Examples of antiblocking agents are Ca carbonate and Mg carbonate, talc, gypsum, silicic acid and silicates with particle sizes preferably in the range from 10 nm to 10 $\mu$m.

To increase the resistance of the glue to water, 0.5 to 10% by weight, based on the polymer, of water-soluble metal salts of monobasic acids with a pKa of less than 0 can also be added to the polymer dispersions or polymer powders stabilized with protective colloids. Salts of Al(III), Fe(III) and Zr(IV), for example aluminium nitrate, iron chloride and zirconium oxychloride, are particularly suitable. Free acids with a pKa of less than 0 can also be employed in the same amounts as hardeners. Examples of these are hydrochloric acid, nitric acid, perchloric acid, phosphoric acid or mixtures thereof. Crosslinking agents can also be added in an amount of 0.5 to 10% by weight, based on the polymer, to further improve the resistance to water. Examples of these are polyisocyanates, formaldehyde-phenol resins or masked polyaldehydes, for example bisulphite adducts of dialdehydes, such as glutaradialdehyde-bis-sodium hydrogen sulphite.

The adhesives are suitable for gluing porous substrates. Examples of this are the gluing of wood, such as wood-wood gluing, and the gluing of wood to absorbent substrates, such as plaster, in particular gluing of parquet. Further uses are waterproof gluing of paper and cardboard, for example as a packaging adhesive and book-binding adhesive. The adhesives are also suitable for gluing fibre materials of natural or synthetic fibre, for example for the production of wood fibreboard, for consolidation of nonwovens of natural or synthetic fibres, for the production of mouldings from fibre materials and for the production of precursors of such mouldings, the so-called semi-finished products (waddings). Further examples of use are the binding of wadding, for example of cushion, insulating and filter wadding, and the production of laminates, such as insulating materials.

The following examples serve to further illustrate the invention:

Preparation of the Polymer Dispersions and Polymer Powders:

EXAMPLE 1

1110 ml of deionized water, 281 g of a 20% strength aqueous solution of a polyvinyl alcohol with a degree of hydrolysis of 88 mol % and a Höppler viscosity of the 4% strength solution of 4 mPas (DIN 53015, Höppler method at 20° C.) and 39 g of a 48% strength aqueous solution of N-methylolacrylamide (NMA) were initially introduced into a stirred autoclave of 5 l capacity. The pH was adjusted to 4.0 to 4.2 with 10% strength formic acid. The autoclave was then evacuated, flushed with nitrogen and evacuated again, and a mixture of 112 g of styrene, 168 g of 1,3-butadiene and 8 g of tert-dodecylmercaptan was sucked in. After heating up to 80° C., the polymerization was started by simultaneous introduction of two catalyst solutions, the first of which comprised 110 g of deionized water and 15.5 g of a 40% strength aqueous tert-butyl hydroperoxide solution and the other of which comprised 116 g of deionized water and 13 g of sodium formaldehyde-sulphoxylate, metering of the two catalyst solutions taking place at the same feed rate (18 ml/h). After the start of the polymerization, the metered addition of a mixture of 951 g of 1,3-butadiene, 634 g of styrene and 9 g of tert-dodecyl mercaptan was started at a rate of 5.3 g/min. At the same time, 619 g of a 20% strength aqueous solution of a polyvinyl alcohol with a degree of hydrolysis of 88 mol % and a Höppler viscosity of the 4% strength solution of 4 mPas (DIN 53015, Höppler method at 20° C.) were metered in at a rate of 0.82 g/min. After the end of the monomer and polyvinyl alcohol feed, after-polymerization was carried out for a further 2 h at 80° C. with an unchanged feed rate of the initiator solution, and the feed of the initiator solutions was then ended and the mixture was cooled.

A stable, relatively finely divided (Coulter LS 230; Dw=0.361 $\mu$m) and coagulum-free dispersion, which had a viscosity (Brookfield viscometer, 20° C., 20 rpm) of 8100 mPas at a solids content of 46.9%, was obtained.

Preparation of the Redispersible Powder:

200 parts by weight of a 10.3% strength solution of a polyvinyl alcohol (degree of hydrolysis 88 mol %, viscosity of the 4% strength solution 13 mPas), 0.84 part by weight of defoamer and 135 parts by weight of water were added to 400 parts by weight of the dispersion and the mixture was mixed thoroughly. The dispersion was sprayed through a two-component nozzle. Air compressed to 4 bar was used as the spraying component, and the drops formed were dried in co-current with air heated to 125° C.

10% of a commercially available antiblocking agent (mixture of calcium/magnesium carbonate and magnesium hydrosilicate) was added to the resulting dry powder.

EXAMPLE 2

The dispersion was prepared analogously to Example 1, using a total of 78 g of a 48% strength aqueous solution of N-methylolacrylamide.

A stable, relatively finely divided (Coulter LS 230; Dw=0.536 $\mu$m) and coagulum-free dispersion, which had a viscosity (Brookfield viscometer, 20° C., 20 rpm) of 24,200 mpas at a solids content of 49.0%, was obtained. All the other measures (for the preparation of the dispersible powder) corresponded to Example 1.

EXAMPLE 3

The dispersion was prepared analogously to Example 1, using a total of 39 g of a 48% strength aqueous solution of N-methylolacrylamide, the total aqueous NMA solution being metered in during the polymerization simultaneously with the metered monomers.

A stable, relatively finely divided (Coulter LS 230; Dw=0.471 $\mu$m) and coagulum-free dispersion, which had a viscosity (Brookfield viscometer, 20° C., 20 rpm) of 7360 mPas at a solids content of 49.5%, was obtained.

All the other measures (for the preparation of the dispersible powder) corresponded to Example 1.

EXAMPLE 4

The dispersion was prepared analogously to Example 1, using a total of 78 g of a 48% strength aqueous solution of N-methylolacrylamide, the total aqueous NMA solution being metered in during the polymerization simultaneously with the metered monomers.

A stable, relatively finely divided (Coulter LS 230; Dw=0.506 $\mu$m) and coagulum-free dispersion, which had a viscosity (Brookfield viscometer, 20° C., 20 rpm) of 14,370 mPas at a solids content of 49.8%, was obtained.

All the other measures (for the preparation of the dispersible powder) corresponded to Example 1.

EXAMPLE 5

The dispersion was prepared analogously to Example 1, 22 g of an 85% strength aqueous solution of N-isobutoxymethylacrylamide (IBMA) being employed instead of NMA.

A stable, relatively finely divided (Coulter LS 230; Dw=0.635 µm) and coagulum-free dispersion, which had a viscosity (Brookfield viscometer, 20° C., 20 rpm) of 6300 mPas at a solids content of 49.3%, was obtained.

All the other measures (for the preparation of the dispersible powder) corresponded to Example 1.

EXAMPLE 6

The dispersion was prepared analogously to Example 1, 44 g of an 85% strength aqueous solution of N-isobutoxymethylacrylamide (IBMA) being employed instead of NMA.

A stable, relatively finely divided (Coulter LS 230; Dw=0.515 µm) and coagulum-free dispersion, which had a viscosity (Brookfield viscometer 20° C., 20 rpm) of 18,300 mPas at a solids content of 49.3%, was obtained.

All the other measures (for the preparation of the dispersible powder) corresponded to Example 1.

EXAMPLE 7

The dispersion was prepared analogously to Example 3, 22 g of an 85% strength aqueous solution of N-isobutoxymethylacrylamide (IBMA) being metered in during the polymerization simultaneously with the metered monomers, instead of the aqueous NMA solution.

A stable, relatively finely divided (Coulter LS 230; Dw=0.456 µm) and coagulum-free dispersion, which had a viscosity (Brookfield viscometer, 20° C., 20 rpm) of 5420 mPas at a solids content of 49.7%, was obtained.

All the other measures (for the preparation of the dispersible powder) corresponded to Example 1.

EXAMPLE 8

The dispersion was prepared analogously to Example 3, 44 g of an 85% strength aqueous solution of N-isobutoxymethylacrylamide (IBMA) being metered in during the polymerization simultaneously with the metered monomers, instead of the aqueous NMA solution.

A stable, relatively finely divided (Coulter LS 230; Dw=0.493 µm) and coagulum-free dispersion, which had a viscosity (Brookfield viscometer, 20° C., 20 rpm) of 10,620 mPas at a solids content of 49.5%, was obtained.

All the other measures (for the preparation of the dispersible powder) corresponded to Example 1.

COMPARISON EXAMPLE 9

The dispersion was prepared analogously to Example 1, neither NMA nor IBMA being employed. All the other measures corresponded to Example 1.

A stable, coarse-particled (Coulter LS 230; Dw=2.63 µm) and coagulum-free dispersion, which had a viscosity (Brookfield viscometer, 20° C., 20 rpm) of 18,400 mPas at a solids content of 49.8%, was obtained.

Use Testing:

Determination of the settling properties of the powders (Tube Settling):

To determine the settling properties, in each case 50 g of the dispersible powder were redispersed in 50 ml of water, the dispersion was then diluted to a solids content of 0.5% and the settling height of solid of 100 ml of this redispersion was introduced into a graduated tube and the settling was measured after 1 hour and 24 hours.

Determination of the Blocking Resistance:

To determine the blocking resistance, the dispersible powder was introduced into an iron tube with a screw fitting and then loaded with a metal stamp. After the loading, the tube was kept in a drying cabinet at 50° C. for 16 hours. After cooling to room temperature, the powder was removed from the tube and the stability to blocking was determined qualitatively by crushing the powder. The stability to blocking was classified as follows:

1=very good stability to blocking
2=good stability to blocking
3=satisfactory stability to blocking
4=not stable to blocking, powder no longer free-flowing after crushing.

Adhesive Strength in Accordance with DIN EN 204/205:

In all the examples listed in Table 1, the adhesive strength was determined after addition of 2.5% by weight of a solution of 50% strength $AlCl_3 * 6\ H_2O$ in water to the polymer dispersions of the examples.

The test specimens were produced in accordance with DIN EN 205. For this, in each case 2 beechwood sheets, each 5 mm thick, 130 mm wide and 600 mm long, were glued to one another with the adhesive dispersion to be tested, under pressure uniformly distributed over the adhesive surface, the glued sheets were divided into test specimens each 150 mm long and these were stored in accordance with DIN EN 204.

For the testing for assignment into stress group D1, the test specimens were stored, after sizing, for 7 days in a standard climate (23° C., 50% atmospheric humidity).

For testing for assignment into stress group D2, the test specimens were stored, after sizing, for 7 days in a standard climate (23° C., 50% atmospheric humidity), then for 3 hours in cold water at 23° C., and finally for a further 7 days in a standard climate.

After the storage, the adhesive strength was determined with the test specimens in a tensile shear test, the glued test specimens being drawn apart and loaded to fracture with a tensile tester at a pull-off rate of 50 mm/minute. At fracture, the prevailing maximum force $F_{Max}$ was determined. The adhesive strength T is calculated in accordance with DIN EN 205 from $T-F_{Max}/A$, wherein A is the glued test area in $mm^2$.

The results of the testing of the adhesive strength are summarized in Table 1.

TABLE 1

|  | Settling 1 h/24 h [cm] | Blocking Resistance | D2/3 [N/mm$^2$] |
|---|---|---|---|
| Example 1 | 0.1/0.5 | 2 | 2.9 |
| Example 2 | 0.1/0.6 | 2 | 3.2 |
| Example 3 | 0.2/0.8 | 2 | 3.7 |
| Example 4 | 0.4/0.8 | 2 | 4.3 |
| Example 5 | 0.2/0.6 | 2 | 2.1 |
| Example 6 | 0.1/0.5 | 2 | 2.2 |
| Example 7 | 0.2/0.6 | 2 | 2.7 |
| Example 8 | 0.1/0.5 | 2 | 2.9 |
| Comp. Ex. 9 | 0.4/0.9 | 2 | 1.2 |

What is claimed is:

1. An adhesive composition for porous material having improved hydrophobicity, water resistance and storage stability, comprised of vinylaromatic/1,3-diene copolymers stabilized with protective colloids, in the form of their aqueous polymer dispersions or water-redispersible polymer powders, the polymer dispersions and the polymer powders being obtained by emulsion polymerization of a mixture comprising a) 20 to 80 percent by weight of one or more vinylaromatics, b) 19.9 to 79.9 percent by weight of one or more 1,3-dienes, c) 0.1 to 15 percent by weight of more comonomers from the group consisting of N-methylolacrylamide, N-methylolmethacrylamide and the N-(alkoxymethyl)-acrylamides and N-(alkoxymethyl)methacrylamides with a $C_1$ to $C_6$-alkyl radical, the percentages by weight adding up to 100%, in the presence of one or more protective colloids and in the absence of emulsifier(s), and optionally drying the aqueous polymer dispersion obtained, wherein said one or more protective colloids are selected from the group consisting of polyvinyl alcohols, starches, modified starches, starch ethers, dextrins, cyclodextrins, celluloses and carboxymethyl, methyl, hydroxyethyl and hydroxypropyl derivatives thereof, poly(meth)acrylic acid, and poly(meth)acrylamide.

2. The adhesive composition of claim 1 wherein the one or more protective colloids are selected from the group consisting of polyvinyl alcohols, starches, modified starches, starch ethers, dextrins, cyclodextrins, celluloses and carboxymethyl, methyl, hydroxyethyl and hydroxypropyl cellulose derivatives.

3. The adhesive composition of claim 1 wherein the one or more protective colloids are hydrophobically modified polyvinyl alcohols with a degree of hydrolysis of 80 to 95 mol % and a Höppler viscosity in 4% strength aqueous solution of 1 to 30 mPa·s.

4. In a process for gluing wood, the improvement which comprises employing the adhesive of claim 1.

5. In a process for gluing wood, the improvement which comprises employing the adhesive of claim 2.

6. In a process for gluing wood, the improvement which comprises employing the adhesive of claim 3.

7. The process of claim 4 wherein the wood is parquet.

8. In a process for gluing a paper product, the improvement which comprises employing the adhesive of claim 2.

9. In a process for gluing a paper product, the improvement which comprises employing the adhesive of claim 2.

10. In a process for gluing a paper product, the improvement which comprises employing the adhesive of claim 3.

11. The process of claim 8 wherein the paper product is cardboard.

12. In a process for packaging products, the improvement which comprises sealing the packaging with the adhesive of claim 2.

13. In a process for binding books, the improvement which comprises binding the books with the adhesive of claim 2.

14. In a process for gluing natural or synthetic fiber materials, the improvement which comprises employing the adhesive of claim 2.

15. In a process for producing wood fiber boards, the improvement which comprises employing the adhesive of claim 2.

16. In a process for consolidation of nonwoven natural or synthetic fibers, the improvement which comprises employing the adhesive of claim 8.

17. The process of claim 16 where the consolidated nonwoven natural or synthetic fibers are in the form of moldings.

18. In a process for binding wadding, the improvement which comprises binding the wadding with the adhesive of claim 2.

19. The process of claim 18 wherein the wadding is in the form of a cushion.

20. The process of claim 18 wherein the wadding is in the form of a laminate.

* * * * *

UNITED STATES PATENT AND TRADEMARK OFFICE
CERTIFICATE OF CORRECTION

PATENT NO. : 6,656,983 B1
DATED : December 2, 2003
INVENTOR(S) : Theo Mayer et al.

It is certified that error appears in the above-identified patent and that said Letters Patent is hereby corrected as shown below:

<u>Column 10,</u>
Line 5, delete "2" and insert -- 1 --.
Line 26, delete "8" and insert -- 2 --.

Signed and Sealed this

Thirteenth Day of April, 2004

JON W. DUDAS
*Acting Director of the United States Patent and Trademark Office*